United States Patent
Ioannidis et al.

(10) Patent No.: US 9,942,311 B2
(45) Date of Patent: Apr. 10, 2018

(54) METHOD AND APPARATUS FOR TRANSFERRING CONTENT AMONG LARGE CLUSTERS OF STORAGE DEVICES TO ACHIEVE A TARGET REPLICATION DISTRIBUTION

(71) Applicant: THOMSON LICENSING, Issy les Moulineaux (FR)

(72) Inventors: Efstratios Ioannidis, Los Altos, CA (US); Laurent Massoulie, Vaucresson (FR); Fabio Picconi, Paris (FR); Wenjie Jiang, Mountain View, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 209 days.

(21) Appl. No.: 14/901,658

(22) PCT Filed: Jun. 27, 2013

(86) PCT No.: PCT/US2013/048198
§ 371 (c)(1),
(2) Date: Dec. 28, 2015

(87) PCT Pub. No.: WO2014/209320
PCT Pub. Date: Dec. 31, 2014

(65) Prior Publication Data
US 2016/0142476 A1   May 19, 2016

(51) Int. Cl.
  *G06F 13/00* (2006.01)
  *H04L 29/08* (2006.01)
  *H04L 29/06* (2006.01)

(52) U.S. Cl.
  CPC ...... *H04L 67/1008* (2013.01); *H04L 65/4069* (2013.01); *H04L 65/80* (2013.01); *H04L 67/1097* (2013.01); *H04L 65/4084* (2013.01)

(58) Field of Classification Search
  CPC ............ H04L 67/1008; H04L 65/4069; H04L 65/4084; H04L 65/80; H04L 67/1097
  (Continued)

(56) References Cited

U.S. PATENT DOCUMENTS 6,199,099 B1 *   3/2001   Gershman ......... G06F 17/30867
                                                    707/999.003
6,980,537 B1   12/2005   Liu
(Continued)

OTHER PUBLICATIONS

Search Report dated Jan. 14, 2014 for Application No. PCT/US13/48198.

*Primary Examiner* — Kenneth R Coulter
(74) *Attorney, Agent, or Firm* — Brian J. Dorini; Robert D. Shedd (57) ABSTRACT

A content distribution network, including: a content server that stores a set of content items; a plurality of gateways for storing and serving content requests to a subset of the content items, the plurality of gateways being grouped into a plurality of classes of gateways; and a plurality of class trackers corresponding to the plurality of classes; wherein each class tracker manages a placement of content items and an assignment of content requests for its class of gateways; wherein the plurality of class trackers exchange congestion signals among themselves; wherein, for each content item, each class tracker determines a fraction of gateways in its class of gateways that store the content item and a rate of content requests that are forwarded to the content server or other class trackers, based on requests for the content item entering its class and the congestion signals received from other class trackers.

14 Claims, 4 Drawing Sheets

(58) Field of Classification Search
USPC .................................... 709/203, 224, 223
See application file for complete search history.

(56) References Cited

U.S. PATENT DOCUMENTS

| | | |
|---|---|---|
| 2003/0174648 A1 | 9/2003 | Wang et al. |
| 2006/0248212 A1 | 11/2006 | Sherer et al. |
| 2008/0059631 A1 | 3/2008 | Bergstrom et al. |

* cited by examiner

Tracker $d$ at the end of round $k$:
    Obtain estimates of $\lambda_c^d, r_c^{\cdot d}, c \in C$.
// Update dual variables
$$s_{tot}^d \leftarrow \frac{1}{|\mathcal{D}|} \left( \Sigma_{c \in C} \, r_c^{\cdot d} + y^d - L^d \right)$$
$$\beta^d \leftarrow \beta_c^d + \theta \, s_{tot}^d$$
for each content $c$
$$s_c^d \leftarrow \frac{1}{|\mathcal{D}|} \left( r^{\cdot d}(t)_c + z_c^d(t) - L^d p_c^d(t) \right)$$
$$\alpha^d \leftarrow \alpha_c^d + \theta s_{tot}^d$$
end for
Broadcast $\left( \alpha^d, \beta^d \, s^d, s_{tot}^d \right)$ to other trakers $d' \in \mathcal{D}$
Receive dual variables from all other trakers $d' \in \mathcal{D}$
// Update primal variables
    Set $\left( r^d, p^d, z^d, y^d \right)$ as the solution to
    LOCAL$^d \left( r^d(t), p^d(t), z^d(t), y^d(t), \alpha(t), \beta(t), s(t), s_{tot}(t) \right)$

*FIG. 3*

Input: Initial placement $\{F_b\}_{b \in \mathcal{B}}$ and target ratios $q_c', p_c'$
Let $A^+ := \{c \in C : q_c > q_c'\}$, $A^- := \{c : \in C : q_c < q_c'\}$;
while there exists $b \in \mathcal{B}$ s.t. $D_b \in A^+$ and $L_b \cap A^- \neq \emptyset$
   Pick $c \in L_b \cap A^-$, and swap it locally with the content of $D_b$.
   Update $q, \pi, A^+, A^-$ accordingly
while there exists $b \in \mathcal{B}$ s.t. $D_b \in A^+$ and $L_b \cap A^- = \emptyset$
   Pick $c \in A^-$, and place $c$ in the designated slot $D_b$;
   Update $q, \pi, A^+, A^-$ accordingly
Let $C^+ := \{c : \pi_c > \pi_c'\}$; $C^+ := \{c : \pi_c < \pi_c'\}$;
$C^0 := C \setminus (C^+ \cup C^-)$.
Let $G := \{b \in \mathcal{B}$ s.t. $C_+ \cap L_b \neq \emptyset$ and $C_- \setminus (D_b \cup L_b) \neq \emptyset\}$;
while $(G \neq \emptyset)$ or (there exists $c \in C^-$ s.t. $(\pi_c - \pi_c')B \geq 2)$
   if $(G \neq \emptyset)$ then
   Pick any $b \in G$
   Replace some $c \in C_+ \cap L_b$ with some $c' \in C_- \setminus (D_b \cap L_b)$;
else
   Pick $c \in C^-$ s.t. $(\pi_c - \pi_c')B \geq 2$.
   Find a box $b$ that does not store $c$.
   Pick $c' \in C_0 \cap L_b$ and replace $c'$ with $c$.
   update $G, \pi, C^+, C^-, C^0$ accordingly.

*FIG. 4*

METHOD AND APPARATUS FOR TRANSFERRING CONTENT AMONG LARGE CLUSTERS OF STORAGE DEVICES TO ACHIEVE A TARGET REPLICATION DISTRIBUTION

TECHNICAL FIELD

This invention relates to content delivery, and more particularly to a method and apparatus for transferring content among large clusters of storage devices to achieve a target replication distribution.

BACKGROUND ART

In a content delivery system, gateways can be used as relays or storage devices to store content (e.g., movies) from a content delivery network ("CDN"). Each gateway would have a dedicated portion of memory set aside for storing movies to be accessed by users outside of the homes where the gateways are located. The gateways and CDN would presumably be owned or managed by a content or service provider who is providing VOD (video on demand) services. As a result, when a user wants to view a movie, the user does not necessarily need to acquire the movie from the CDN server. The user may acquire a copy of the movie stored in a home gateway in the vicinity of the user (e.g., in the user's neighborhood or city). One benefit of this approach is alleviation of traffic on the CDN's servers and over ISP networks. Since the CDN typically pays for the use of ISP networks, accessing locally stored or cached movies also reduces the CDN's cost for providing the movie. The CDN may also receive cost savings since the CDN can have a smaller server cluster than would otherwise be needed if the gateways were not utilized. Another benefit of this approach is that potential delay of accessing the requested movie is reduced (i.e., it may be quicker to access the movie from a nearby gateway than from a remote CDN server).

Although there are a number of benefits there are also a number of potential issues with the traditional approach. For example, where should a movie be cached or stored? How many copies of a movie should be cached or stored? (e.g., how many copies per block? per city?) How to efficiently use the gateway's limited bandwidth? For example, gateways can only be accessed for a limited number (e.g., 5) of simultaneous downloads. Additionally, there are different costs associated with accessing nearby gateways, remote gateways and the CDN server.

Thus, a need exists for solving these issues and minimizing the operating costs of the content delivery system.

BRIEF SUMMARY

This disclosure describes a method for changing the content stored in a multitude of storage devices (e.g., set-top gateways or home gateways) called peers. The method determines how to change the content in order to reach a target content distribution. In particular, it defines the replication ratio of a file as the fraction of peers that store a file. Given a target replication ratio, the method determines how peers should change their content in order so that, in the end, the files are replicated are such that the target replication ratio is met. Most importantly the method or process of the present disclosure achieves the target replication ratio by requiring a very small number of content changes in the storage devices. This is important, because the more content changes one makes on storage devices, the higher the bandwidth the system will need to consume to implement them by copying files to these devices.

One embodiment provides a content distribution network, including: a content server that stores a set of content items; a plurality of gateways for storing and serving content requests to a subset of the content items, the plurality of gateways being grouped into a plurality of classes of gateways; and a plurality of class trackers corresponding to the plurality of classes of gateways; wherein each class tracker manages a placement of content items and an assignment of content requests for its corresponding class of gateways; wherein the plurality of class trackers exchange congestion signals among themselves; wherein, for each content item, each class tracker determines a fraction of gateways in its corresponding class of gateways that store the content item and a rate of content requests that are forwarded to the content server or other class trackers, based on requests for the content item entering its class and the congestion signals received from other class trackers.

Another embodiment provides a method of operating a content distribution network, the content distribution network including a content server that stores a set of content items, a plurality of gateways for storing and serving content requests to a subset of the content items, the plurality of gateways being grouped into a plurality of classes of gateways, and a plurality of class trackers corresponding to the plurality of classes of gateways, the method including: managing, by each class tracker, a placement of content items and an assignment of content requests for its corresponding class of gateways; exchanging congestion signals among the plurality of class trackers; and for each content item, determining, by each class tracker, a fraction of gateways in its corresponding class of gateways that store the content item and a rate of content requests that are forwarded to the content server or other class trackers, based on requests for the content item entering its class and the congestion signals received from other class trackers.

Objects and advantages will be realized and attained by means of the elements and couplings particularly pointed out in the claims. It is important to note that the embodiments disclosed are only examples of the many advantageous uses of the innovative teachings herein. It is to be understood that both the foregoing general description and the following detailed description are exemplary and explanatory and are not restrictive of the invention, as claimed. Moreover, some statements may apply to some inventive features but not to others. In general, unless otherwise indicated, singular elements may be in plural and vice versa with no loss of generality. In the drawings, like numerals refer to like parts through several views.

DETAILED DESCRIPTION

Figure 1:
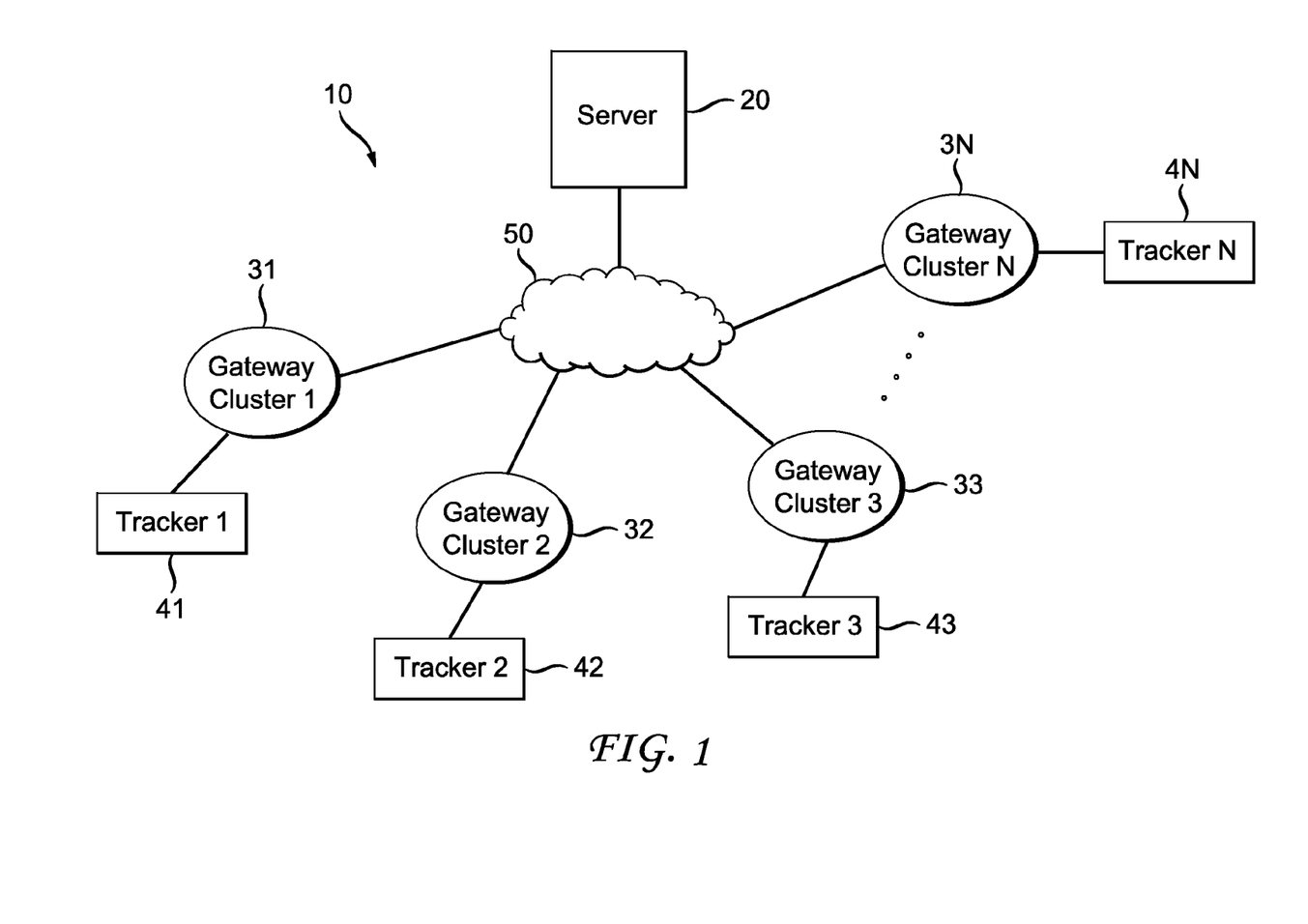
FIG. 1 depicts a block schematic diagram of a content delivery system according to an embodiment.

As shown in FIG. 1, the present disclosure may be utilized in a content delivery network (CDN) 10 having a CDN serer 20, class trackers 41, 42, 43, . . . , 4N, (mini-servers responsible for small parts of the CDN) to track the activity of clusters, sub-networks or classes of gateways 31, 32, 33, ..., 3N. The gateways and the server are connected via network 50. For example, each gateway class contains 1,000 to 10,000 gateways. It should be noted that each gateway class could be a few city blocks, a small town, etc. Furthermore the gateway classes could be local (e.g., an adjacent city block) or remote (e.g., a first class in LA and a second class in Chicago). The class tracker for each gateway class tracks which gateways are in the class, which gateways are on or off, the content or files (e.g., movies) stored on each gateway, and if gateway is busy or not (i.e. how many concurrent uploads each gateway is serving at the moment. There will be a limit on the number of concurrent uploads, e.g., not to exceed 5).

Figure 2:
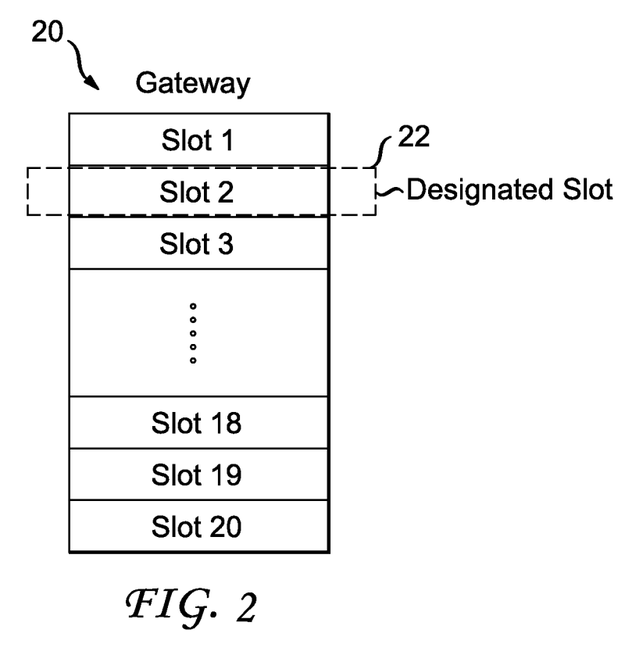
FIG. 2 depicts a block schematic diagram of a gateway according to an embodiment.

Referring now to FIG. 2, an exemplary gateway is shown. The gateway 20 may, for example, have up to twenty slots of memory where content or files (e.g., movies) can be stored. Presumably, one movie can be stored in each gateway slot. The gateway 20 has a special slot called a designated slot 22. The designated slot 22 is used for the storage of a file which can be accessed by other gateways. The CDN determines what movies are stored in the designated slots 22. As an example, assuming that there are only 5 movies (movies A, B, C, D and E) in a CDN. If movie A is being requested 40% of the time, movie B is being requested 20% of the time, movie C is being requested 20% of the time and movies D and E are each being requested 10% of the time then the CDN would configure the content placement such that 40% of the gateways would store movie A in their designated slot, 20% of the gateways would store movie B in their designated slot, 20% of the gateways would store movie C in their designated slot, 10% of the gateways would store movie D in their designated slot, and 10% of the gateways would store movie E in their designated slot. After a fixed time period (e.g., an hour, two hours or six hours) the class trackers communicate congestion signals between themselves. The process is iterative because the type of content and demand for the content will change over time (e.g., in response to the release of new movies). The class trackers use the congestion signals to adapt "replication ratio" and "forwarding rate" parameters. More specifically, the class tracker determines the number of files (e.g., copies of a movie) that should be stored in the tracker's class and the fraction of requests from gateways in its own class that should be forwarded to other classes or to the CDN server. In other words the tracker, based on the congestion signals, determines replication ratios for each content item (e.g., movie file) and determines forwarding rates (fraction of requests within class that goes to another class, the CDN server, etc.). The present disclosure is directed towards using the replication ratio to change the type of and number of copies of content stored in the gateways (i.e., content placement).

Changing the placement of content is not simple. One starts with an initial placement indicating what files (e.g., movies) each Gateway in the CDN is storing and the maximum amount of files that may be stored by each gateway (e.g., 20 files). After the exchange of congestion signals, a new replication ratio is calculated. The replication ratio will indicate that a change content placement must be made. It should be noted that the target configuration of the content placement must satisfy the new replication ratios for all files in the CDN. The algorithm of the present disclosure aims to achieve the target configuration with a minimum amount of change to the movies stored in the designated slots. It should be noted that the algorithm of the present disclosure is not limited to the assignment of movies in designated slots in gateways in a CDN. For example, the algorithm can be used in servers running virtual machines where the number of desired virtual machines changes.

System Model and Architecture

The modeling assumptions and proposed content distribution system architecture are now described according to an embodiment. The system consists of a set $\mathcal{B}$ B of B:=$|\mathcal{B}|$ gateways (boxes) as well as a distinguished node s, the content server. The gateways are installed at users' homes, providing basic Internet connectivity and limited storage. The content server s is owned and operated by a content provider, such as YouTube or iTunes, and is used to deliver content (e.g., videos or songs) to home users owning gateways. The collection of delivered content constitutes set $\mathcal{C}_s$, C=$|\mathcal{C}_s|$, which is called the content catalog. All contents are replicated at server s. A fraction of the storage and upload capacities of gateways is leased out to the content provider, which uses these resources to off-load part of the traffic on s to the gateways.

Gateway Classes

The set $\mathcal{B}$ of gateways is partitioned into D classes $\mathcal{B}^d$ of size $\mathcal{B}$ B$^d$:=$|\mathcal{B}^d|$, where d∈$\mathcal{D}$=$\{1, \ldots, D\}$. Such partitioning may correspond, e.g., to grouping together gateways managed by the same ISP. Different levels of aggregation or granularity can also be used: for example, each class may comprise gateways within the same city or even the same city block.

Classes are heterogeneous: storage and bandwidth capacities of gateways may differ across classes. The notation $M^d$ denotes the storage capacity of gateways in $\mathcal{B}^d$—i.e., the number of items these gateways store. Here it is assumed that contents have the same size; this holds for instance if original contents are chopped into fixed size chunks, by viewing the catalog as a collection of chunks rather than original objects. For each b∈$\mathcal{B}^d$, let $$\mathcal{F}_b \subset \mathcal{C}_s, |\mathcal{F}_b|=M^d,$$

be the content set stored in gateway b. Moreover, let $$p_c^d = \sum_{b \in \mathcal{B}^d} \mathbb{I}_{c \in \mathcal{F}_b} /B^d, d \in \mathcal{D}, c \in \mathcal{C}_s, \quad (1)$$

be the fraction of gateways in $\mathcal{B}^d$ that store content c∈$\mathcal{C}_s$. The term $p_c^d$ is the replication ratio of item c in class d. As the total storage capacity of class d is $B^d M^d$, it is easy to see that, when all caches are full, the replication ratios satisfy $$\Sigma_{c \in \mathcal{C}_s} p_c^d = M^d. \quad (2)$$

The notation $U^d$ denotes the upload capacity of gateways in $\mathcal{B}^d$. Here, a loss model is used, rather than a queueing model, to capture the upload behavior of gateways: a gateway can upload at most $U^d$ content items concurrently, each at a fixed rate. Alternatively, each gateway has $U^d$ upload "slots": once a gateway receives a request for content it stores, if a free upload slot exists, this slot is used to serve the request and upload the requested content. Upload (i.e., service) times are assumed exponentially distributed with mean one. Slots remain busy until the upload terminates, at which point they become free again. While all $U^d$ slots of a gateway are busy, it is unable to serve any additional requests for content.

This model corresponds to delegating a portion of the gateway's upload capacity, e.g., 5 MBps, to the CDN. If U=5, then the gateway supports at most 5 concurrent uploads, at 1 MBps each.

Request Load

Gateway users generate requests for content at rates that vary across different classes. In particular, each b∈$\mathcal{B}^d$ generates requests for content c according to a Poisson process with rate $\Lambda_c^d$. The aggregate request rate for c in class d is $\lambda_c^d = \Lambda_c^d B^d$ and thus scales proportionally to the class size. When a gateway $b \in \mathcal{B}^d$ storing $c \in \mathcal{C}$ (i.e., $c \in \mathcal{F}_b$), generates a request for c, it is served by the local cacheno downloading is necessary. Otherwise, the request must be served by either the content server s or some other gateway, in $\mathcal{D}^d$ or in a different class.

The notation $r_c^{dd'}$ denotes the rate of requests routed from class d to gateways in d', and by $r_c^{ds}$ the rate of requests routed directly to the server. These rates must satisfy $$r_c^{ds} + \sum_{d' \in \mathcal{D}} r_c^{dd'} = \lambda_c^d(1-p_c^d), \tag{3}$$

i.e., requests not immediately served by local caches in class d are served by server s or a gateway in some class $d' \in \mathcal{D}$.

Loss Probabilities

Not all requests for content c that arrive at a class d can be served by gateways in d. For example, it is possible that no free upload slots in the class exist when the request for c arrives. In such a case, it is assumed that a request has to be "dropped" from class d and re-routed to the server s.

Let $v_c^d$ be the loss probability of item c in class d, i.e., the steady state probability that a request for a content item c is dropped upon its arrival and has to be rerouted to s. In general, $v_c^d$ depends on the following three factors: (a) the arrival rates $\{r_c^{\cdot d}\}_{c \in \mathcal{C}}$ of requests for different contents, where $r_c^{\cdot d} := \sum_{d' \in \mathcal{D}} r_c^{d'd}$, $c \in \mathcal{C}$, is the aggregate request rate for content c received by class d, (b) the contents $\{\mathcal{F}_b\}_{b \in \mathcal{B}_d}$ of class gateways, and (c) the algorithm assigning incoming requests to gateways that serve them.

It is said that the requests for item c are served with high probability (w.h.p.) in class d if $$\lim_{B \to \infty} v_c^d(B) = 0 \tag{4}$$

i.e., as the total number of gateways increases, the probability that a request for content c is dropped goes to zero. Two necessary constraints for (4) to hold for $d \in \mathcal{D}$ are:

$$\sum_{c \in \mathcal{C}} r_c^{\cdot d} < B^d U^d, \text{ and} \tag{5}$$

$$r_c^{\cdot d} < B^d U^d p_c^d, \forall c \in \mathcal{C}. \tag{6}$$

Indeed, constraint (5) states that the aggregate traffic load imposed on class d should not exceed its total upload capacity. Similarly, (6) states that the traffic imposed on d by requests for c should not exceed the capacity of gateways storing c.

In the paper "Orchestration of Massively Distributed CDNs," Technicolor Technical Report No. CR-PRL-2011-08-0001, it is shown that (5) and (6) are also sufficient for (4), by exhibiting (a) an algorithm for assigning incoming requests to gateways and (b) an algorithm for selecting the contents $\{\mathcal{F}_b\}_{b \in \mathcal{B}d}$ so that requests for all contents $c \in \mathcal{C}$ are served w.h.p., precisely when (5) and (6) are satisfied. The entire content of the paper "Orchestration of Massively Distributed CDNs" is hereby incorporated by reference.

Cross-Traffic Costs

Serving a user in class $d \in \mathcal{D}$ from a gateway in class $d' \in \mathcal{D}$ may require transferring content across different ISPs; the same is true for downloading content from the server s. Depending on the peering relationships between the ISPs involved, the cost of serving a request across different classes (or the server) may vary. This is captured by the following linear cost model. Transferring at a rate x from $d' \in \mathcal{D} \cup \{s\}$ to a gateway in $\mathcal{B}^d$ incurs a per time unit cost $w^{dd'} x$ for some positive $w^{dd'}$.

Recall that a fraction $v_c^d$ of requests for c arriving to class $d \in \mathcal{D}$ are redirected to the server. Assuming that downloads dominate traffic, the aggregate traffic cost in the system is:

$$\sum_{c,d} [w^{ds} r_c^{ds} + \sum_{d'} (w^{dd'} r_c^{dd'}(1 - v_c^{d'}) + w^{ds} r_c^{dd'} v_c^{d'})]$$

Note that, when (4) holds, the average cost per gateway in the system for large B is arbitrarily close to $$\sum_{c \in \mathcal{C}, d \in \mathcal{D}} [w^{ds} r_c^{ds} + \sum_{d' \in \mathcal{D}} w^{dd'} r_c^{dd'}]/B.$$

Cost Minimization

Any costs incurred by cross-traffic transfers are paid by the content provider: this is consistent with the assumption that the content provider deploys and manages the peer-assisted CDN. It is therefore in its interest to reduce costs. In particular, the content provider would like to determine (a) the contents $\mathcal{F}_b$ of each gateway b and (b) where requests generated by gateways should be routed so that the aggregate cost is minimized.

Let $r^d = [r_c^{dd'}]_{d' \in \mathcal{D} \cup \{s\}, c \in \mathcal{C}}$, $p^d = [p_c^d]_{c \in \mathcal{C}}$, be the request rates and replication ratios respectively in class d. In view of the previous discussion, a lower bound on the operator's cost is provided by the solution to the linear program:

Global $$\text{Minimize } \sum_{d \in \mathcal{D}} F^d(r^d) \tag{7a}$$

$$\text{Subject to: } \sum_{c \in \mathcal{C}} p_c^d = M^d, \forall d \in \mathcal{D} \tag{7b}$$

$$\sum_{d' \in \mathcal{D}} r_c^{dd'} + r_c^{ds} = \lambda_c^d(1-p_c^d), \forall c \in \mathcal{C}, d \in \mathcal{D} \tag{7c}$$

$$\sum_{c \in \mathcal{C}} r_c^{\cdot d} \leq L^d, \forall d \in \mathcal{D} \tag{7d}$$

$$r_c^{\cdot d} \leq L^d p_c^d, \forall c \in \mathcal{C}, d \in \mathcal{D} \tag{7e}$$

Variables: $r_c^{dd'} \geq 0, r_c^{ds} \geq 0, p_c^d \geq 0, \forall c \in \mathcal{C}, d, d' \in \mathcal{D}$ where $L^d = B^d U^d (1-\epsilon)$ for some small $\epsilon > 0$, and $$F^d(r^d) = \sum_{c \in \mathcal{C}} (w^{ds} r_c^{ds} + \sum_{d' \in \mathcal{D}} w^{dd'} r_c^{dd'}) \tag{8}$$

is the total cost of requests generated by class d. In other words, the objective is to minimize the total cost incurred by content transfers. Constraints (7b) and (7c) correspond to equations (2) and (3); they state that the full storage capacity of each class is used and that all requests are eventually served, respectively. Constraints (7d) and (7e) correspond to (5) and (6), respectively; the small $\epsilon$ ensures the strictness of inequalities (7d) and (7e).

This lower bound on the operator's cost will in fact be achievable if request rates and replication ratios are chosen so as to solve this linear program, when within each class service assignment and content placement is performed as described below. The service operator therefore needs to solve this optimization. To be practical, candidate approaches need to be scalable w.r.t. the number of classes. To address scalability, class trackers are introduced: these solve the above optimization in a distributed manner, while also managing content placement and service assignment within their class.

Class Trackers

Each class tracker has a full view of the current state of gateways in its own class. In particular, it is at all times aware of (a) which contents are stored in each gateway, (b) how many free upload slots they have, and (c) which content they are uploading. As discussed below, both the placement of content at gateways and the assignment of requests to gateways is handled through the trackers, so this state information is available to them. Nevertheless, class trackers have no a-priori knowledge of the state of gateways at different classes.

The operations performed by trackers on behalf of the content provider are as follows:

Global Optimization. The tracker in class d determines (a) the fraction $p_c^d$ of gateways in the class that store content $c \in \mathcal{C}$, as well as (b) the rate of requests $r_c^{dd'}$, $d' \in \mathcal{D} \cup \{s\}$ that are forwarded to the server or to other class trackers by solving GLOBAL in a distributed fashion. When performing this optimization, the tracker takes into account the traffic of requests entering the class d, as well as certain congestion signals it receives from other classes.

Request Routing. Having determined the rates $r_c^{dd'}$, the tracker implements a routing policy for requests generated in the class. In particular, it routes new requests by gateways in $\mathcal{B}^d$ to either the server, a gateway within class d, or the tracker of another class so that the rates to $d' \in \mathcal{D} \cup \{s\}$ are indeed $r_c^{dd'}$.

Service Assignment. Whenever a request (either internal or external) for a content c is to be served by a gateway in class d, the tracker maps it to a gateway in $b \in \mathcal{B}^d$ that can serve it. This b must store c—i.e., $c \in F_b$—and have an empty upload slot. If no such gateway exists, the tracker re-routes this request to s.

Content Placement. Having determined the replication ratios $p_c^d$ of each content item in class d, the tracker allocates the content items to gateways. That is, for each gateway $b \in \mathcal{B}^d$, it determines $F_b$ in a manner so that (1) is satisfied.

Most importantly, the service assignment and the content placement are performed by the tracker in class d in a manner so that requests arriving in d are served w.h.p., provided that (7d) and (7e) hold. In what follows, each of these operations is described in more detail.

Global Optimization

Below presents how the trackers solve GLOBAL to determine their content replication ($p^d$) and request routing ($r^d$) parameters in a distributed fashion. In short, trackers exchange messages and adapt these values over several rounds. This solution ensures that both the request rates and the replication ratios adapt in a smooth fashion, i.e., changes between two iterations are incremental and the system does not oscillate wildly. This is important as abrupt changes to $p^d$ require reshuffling the contents of many gateways, which results in a considerable cost in data transfers.

In the paper "Orchestration of Massively Distributed CDNs," it is shown that it is difficult to solve GLOBAL in a distributed fashion with standard method. A distributed implementation is presented below.

Distributed Implementation

An interior point method is used that deals with the lack of strict convexity called the method of multipliers. First, (7d) and (7e) are converted to equality constraints by introducing appropriate slack variables $y^d$, $z^d = [z_c^d]_{c \in C_s}$:

$$\Sigma_{c \in C_s} r_c^{\cdot d} + y^d = L^d, \forall d \in \mathcal{D} \quad (11a)$$

$$r_c^{\cdot d} + z_c^d = L^d p_c^d, \forall c \in C_s, d' \in \mathcal{D} \quad (11b)$$

$$y^d \geq 0, z_c^d \geq 0, \forall c \in C_s, d \in \mathcal{D}.$$

Figure 3:
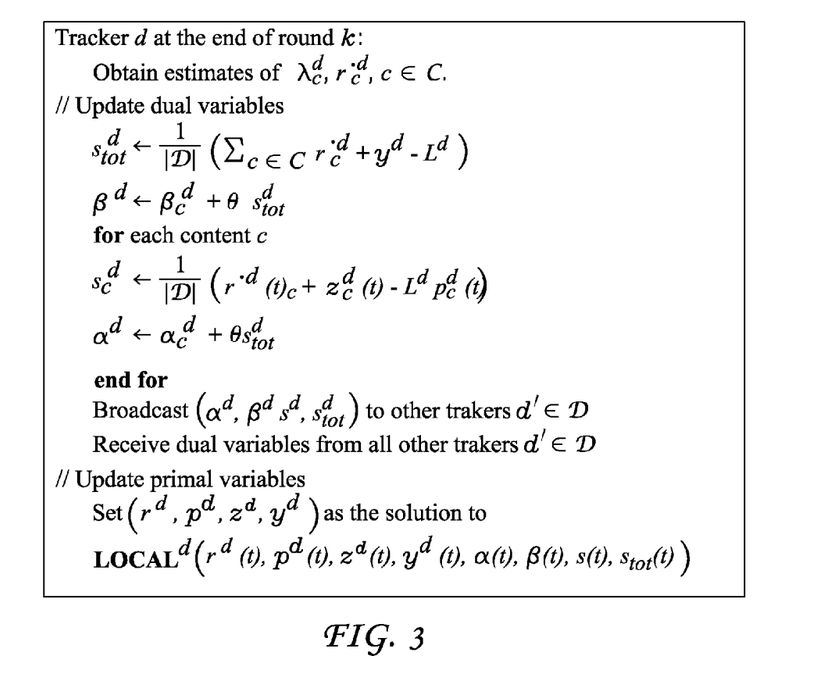
FIG. 3 depicts an algorithm for distributed implementation according to an embodiment.

Under this modification, GLOBAL has the following properties. First, the objective (7a) is separable in the local variables ($r^d$, $p^d$, $y^d$, $z^d$), corresponding to each class. Second, and the constraints (11a) and (11b) coupling the local variables are linear equalities. Finally, the remaining constraints (7b) and (7c) as well as the positivity constraints define a bounded convex domain for the local primal variables. As a result, the method of multipliers admits a distributed implementation. Applying this distributed implementation to GLOBAL the algorithm summarized in FIG. 3 is obtained. The tracker in class d maintains the following local variables, which correspond to the primal and dual variables of (7):

$r^d(t)$, $p^d(t)$, $z^d(t)$, $y^d(t)$, $\alpha^d(t)$, $\beta^d(t)$.

As in the dual decomposition method, the tracker in class d also maintains estimates of $\lambda_c^d$, i.e., the request rate of c from gateways within its own class, and $r_c^{\cdot d}$, i.e., the request rate for content c to be served by gateways in $\mathcal{B}^d$. Using these estimates, the primal and dual variables are updated as follows. At the end of round t, the tracker in class d uses the estimates of $r_c^{\cdot d}$ to see whether constraints (11a) and (11b) are violated or not. In particular, the tracker computes the quantities:

$$s_{tot}^d(t) = (\Sigma_{c \in C_s} r_c^{\cdot d}(t) + y^d(t) - L^d)/|\mathcal{D}|$$

$$s_c^d(t) = (r_c^{\cdot d}(t) + z_c^d(t) - L^d p_c^d(t))/|\mathcal{D}|, c \in C_s,$$

and updates the dual variables as follows:

$$\beta^d(t) = \beta^d(t-1) + \theta(t) s_{tot}^d(t)$$

$$\alpha_c^d(t) = \alpha_c^d(t-1) + \theta(t) s_c^d(t), c \in C_s,$$

where $\{\theta(t)\}_{t \in \mathbb{N}}$ is are positive and non-decreasing. Subsequently, the tracker broadcasts to every other tracker in $\mathcal{D}$ a message containing its new dual variables as well as the congestion signals $\alpha^d(t)$, $\beta^d(t)$, $s^d(t)$, $s_{tot}^d(t)$. Note that these comprise $2(|\mathcal{D}|+1)$ values, in total. For any d, $d' \in \mathcal{D}$, let $$G_{tot}^{d'}(r^d, y^d) = \Sigma_c r_c^{dd'} + \mathbb{1}_{d=d'} y^d$$

$$G_c^{d'}(r^d, p^d, z^d) = r_c^{dd'} + \mathbb{1}_{d=3}(z_c^d - L^d p_c^d).$$

Intuitively, these capture the "contribution" of the primal variables of class d to the constraints (11a) and (11b) of class d'. After the tracker in class d has received all the messages sent by other trackers, it solves the following quadratic program:

LOCAL$^d$ ($r^d(t)$, $p^d(t)$, $z^d(t)$, $y^d(t)$, $\alpha(t)$, $\beta(t)$, $s(t)$, $s_{tot}(t)$)

Minimize: $F^d(r^d) + \Sigma_{d'} \beta^{d'}(t) G_{tot}^{d'}(r^d, y^d) + \Sigma_{d',c} \alpha_c^{d'}(t) G_c^{d'}(r^d, p^d, z^d) + \frac{1}{2}\theta(t) \Sigma_{d'} [(G_{tot}^{d'}(r^d - r^d(t), y^d - y^d(t)) + s_{tot}^{d'}(t))^2 + \Sigma_c (G_c^{d'}(r^d - r^d(t), p^d - p^d(t), z^d - z^d(t)) + s_c^{d'}(t))^2]$ Subject to: $(r^d, p^d, y^d, z^d) \in \mathcal{J}^d$, $\forall d \in \mathcal{D}$
Variables: $r^d, p^d, y^d, z^d, d \in \mathcal{D}$,
where $\mathcal{J}^d$ is the set of quadruplets $(r^d, r^d, y^d, z^d)$ defined by (7b) and (7c) as well as the non-negativity constraints. LOCAL$^d$ thus receives as input all the dual variables $\alpha$, $\beta$, the congestion variables s, $s_{tot}$, as well as all the local primal variables at round t. The last four are included in the quadratic terms appearing in the objective function, and ensure the smoothness of the changes to the primal variables from one round to the next. As indicated in the paper "Orchestration of Massively Distributed CDNs," this algorithm indeed converges to an optimal solution.

Request Routing and Service Assignment

Having presented how trackers determine the replication ratios ($p^d$) and the request rates ($r^d$) in each round, next things to be considered are how trackers (a) route requests generated within class d and (b) assign incoming requests to gateways that can serve them. Using the replication ratios to determine how content is placed in gateways in the class is presented in the next section. A key aspect of the service assignment and content placement policies is that, at all rounds, the following property holds: if conditions (7d) and (7e) hold for a class d, requests routed to the class are served w.h.p.

Request Routing Policy

From (7c), the rates of requests for content c coming out of class d sum up to $\lambda_c (1-p_c^d)$. The tracker of class d determines where such requests are to be routed in the following fashion. Whenever the tracker in class d is contacted by one of the gateways in $\mathcal{B}^d$ with a request for content c, it forwards it to $d' \in \mathcal{D} \cup \{s\}$ with a probability proportional to $r_c^{dd'}$. Note that, as a result, the processes describing the requests forwarded from class d to d' are independent Poisson processes with rates $r_c^{dd'}$.

Service Assignment Policies

The service assignment policy of a tracker determines at which gateway an incoming request should be assigned upon its arrival to the class tracker. In particular, observe that requests for c arrive in class d according to a Poisson process with rate $r_c^d = \sum_{d' \in \mathcal{D}} r_c^{d'd}$. Recall that an incoming request for content c will be assigned to a gateway that can serve it, provided that such a gateway exists; otherwise, the request is re-routed to the server. The following two policies for assigning incoming requests to gateways are considered: the uniform slot policy and the repacking policy.

Uniform Slot. Under the uniform slot policy, an incoming request for content c is assigned to a gateway selected among all gateways currently storing c and having an empty upload slot. Each such gateway is selected with a probability that is proportional to the number of its empty slots. Equivalently, the request is matched to an upload slot selected uniformly from all free upload slots of gateways that can serve it. Formally, let $X_b$ is the number of free upload slots of gateway $b \in \mathcal{B}^d$. Then, the incoming request for content c is mapped to a slot selected uniformly at random among the $\sum_{b \in \mathcal{B}: c \in \mathcal{F}_b} X_b$ free slots of gateways that can serve this request. Note that if this sum is zero—i.e., no gateway that stores content c has a free upload slot—the incoming request for c is re-routed to the service provider.

Repacking. A drawback of the uniform slot policy is that it is not possible to serve a request for c if no gateway storing c has a free upload slot. One way to address this is through repacking.

Consider the following example. A request for content c arrives at the tracker but no gateway storing c currently has an empty slot. However, there exists a gateway b storing c that is presently using one of its upload slots to serve a request for some other content c'. In addition, there also exists a gateway b' storing c' that has an empty upload slot. Then, the download for content c' can be terminated at b and resumed from b'. This immediately releases a slot from gateway b, allowing the incoming request for c to be served. Note that this request reassignment serves the new request without changing the contents of either b or b'.

The act of reassigning already served requests this way is referred to as repacking. In general, a repacking that enables an incoming request for c to be served might require reassigning more than one existing request. Formally, consider a bipartite graph $G(V_{req} \cup V_{slot}, E)$, where each node $r \in V_{req}$ corresponds to all requests currently being served by gateways in the class, and each node in $s \in V_{slot}$ corresponds to an upload slot at some gateway. Define the edge set E as follows: an edge between a request r and a slot s exists in E if the node b to which this slot belongs stores the item requested by r. Then, all requests in set $V_{req}$ can be served if and only if there exists a maximum matching of G that includes all nodes in $V_{req}$. The repacking service assignment policy is formally defined as follows. At any point in time, the graph $G(V_{req} \cup V_{slot}, E)$ is maintained by the tracker. When a new request arrives, it is added to the set $V_{req}$ and connected to all upload slots in $V_{slot}$ that can serve it. If a maximum matching containing all requests exists, the request can be served, and the matching also determines how existing requests should be re-assigned. If no such matching exists, the request is dropped. Note that, as the size of the bipartite graph G can be no more than $2B^d U^d$, the repacking policy can be implemented in a polynomial time in the number of gateways.

Capacity Region

Given a set of contents $\mathcal{F} \subset \mathcal{C}$, with $|\mathcal{F}| = M$, let $\mathcal{B}^d_{\mathcal{F}} = \{b \in \mathcal{B}^d : \mathcal{F}_b = \mathcal{F}\}$ be the set of gateways in class d that store $\mathcal{F}$. Such sets partition $\mathcal{B}^d$ to subclasses, each one comprising gateways storing identical content.

Let the number of gateways $B = |\mathcal{B}|$ go to infinity, while scaling both the request arrival rates $r_c^d$ and the size of the subclasses $B^d_{\mathcal{F}} = |\mathcal{B}^d_{\mathcal{F}}|$ proportionally to B. That is, the quantities $r_c^d / B$, $B^d_{\mathcal{F}} / B$ are constants that do not depend on B as the latter scales to infinity. This scaling follows from the modeling assumptions: as the number of gateways increases, the demand for content as well as the aggregate storage and upload capacity grow linearly with the gateway population.

Consider the following condition on the arrival rates:

$$\sum_{c \in A} r_c^d < \sum_{\mathcal{F}: \mathcal{F} \cap A \neq \varphi} B^d_{\mathcal{F}} U^d, \forall A \subseteq \mathcal{C} \quad (12)$$

Inequality (12) states that for any set of items $A \subseteq \mathcal{C}$, the arrival rate of requests for these items does not exceed the total upload capacity of class d gateways storing these items.

It can be shown that, if the repacking policy is used, condition (12) is sufficient for requests for all c to be served w.h.p., in the sense of (4).

Given that the repacking policy is more sophisticated than the uniform slot policy, one expects that the latter exhibits higher loss probabilities. In the paper "Orchestration of Massively Distributed CDNs," it is shown that, asymptotically, the two policies have the same capacity region.

Note that it is an asymptotic result: for any finite system size, the repacking policy will outperform uniform repacking in terms of the loss probabilities $v_c^d$. However, as the system size increases the relative benefit vanishes. For the purposes of this analysis, either of the policies can be used by the system design; the repacking policy leads to lower dropping probabilities and, thus, better approximation of MinCOST by the convex approximation GLOBAL. This comes however at the relative higher cost of implementing repacking, which requires solving a maximum matching problem with each arrival of a new request.

Content Placement

Condition (12) stipulates that every subset of $\mathcal{C}$ should be stored by enough gateways to serve incoming requests for all content in this set. This section describes a content placement scheme under which, if the conditions (7d) and (7e) of GLOBAL hold, then so does (12). As a result, provided that (7d) and (7e) hold, this scheme combined with the uniform slot policy ensure that all requests are served w.h.p.

As the replication ratios $p^d$ change from one round of the optimization to the next, cache contents $\{\mathcal{F}_b\}_{b \in \mathcal{B}^d}$ are modified to reflect this. This placement algorithm exploits the fact that changes in $p^d$ are smooth, by reconfiguring $\{\mathcal{F}_b\}_{b \in \mathcal{B}^d}$ with as few content exchanges as possible.

Designated Slot Placement

For every gateway $b \in \mathcal{B}^d$, a special storage slot is identified which is called the designated slot. The content of this slot is denoted by $D_b$ and the remaining contents of b by $L_b = \mathcal{F}_b \setminus \{D_b\}$. For all $c \in \mathcal{C}$, let $\epsilon_c^d = \{b \in \mathcal{B}^d : D_b = c\}$ be the set of gateways storing c in their designated slot. In the paper "Orchestration of Massively Distributed CDNs," it is shown that the following lemma holds:

Lemma 1: If $|\epsilon_c^d| > r_c^d U^d$, then (12) holds.

Lemma 1 implies that the exact fraction of gateways that store content c in their designated slot should exceed $r_c^d / B^b U_d$ but not $p_c^d$. The following lemma states that such fractions can be easily computed if the conditions in GLOBAL hold.

Lemma 2: Given d, consider $r_c^d$ and $p_c^d$, $c \in \mathcal{C}$, for which (7d) and (7e) hold. There exist $q_c^d \in [0, 1]$, $c \in \mathcal{C}$, such that $$\sum_c q_c^d = 1, 0 \leq r_c^d / B^b U^d < q_c^d \leq p_c^d \leq 1, \forall c \in \mathcal{C}. \quad (13)$$

Moreover, such $q_c^d$ can be computed in $O(|C_j| \log |C_j|)$ time. The above lemma is also proved in the paper "Orchestration of Massively Distributed CDNs."

In other words, if (7d) and (7e) of GLOBAL hold, ensuring that requests for all contents are served w.h.p. in class d is achieved by placing content c in the designated slot of at least $q_c^d B^d$ gateways, where $q_c^d B^d$ are determined as in Lemma 2. Such a placement scheme is called a designated slot placement. Below describes an algorithm that, given ratios $q_c^d$ and $p_c^d$, places content in class d in a way that these ratios are satisfied.

Algorithm Constructing a Designated Slot Placement

For simplicity, the superscript d is dropped in the remainder of this section, though content placement in a single class is being referred. Focused is on the scenario where an initial content placement $\{F_b\}_{b \in} B$ over B gateways in set $B$ is given. The algorithm, outlined in FIG. 4, receives this placement as well as target replication ratios $q'_c$ and $p'_c$, $c \in C_j$, satisfying (13). It outputs a new content placement $\{F'_b\}_{b \in B}^d$ in which $q'_c$ B gateways store c in their designated slot, while approximately $q'_c$ B gateways store c overall. Moreover, it does so with as few changes of gateway contents as possible.

Figure 4:
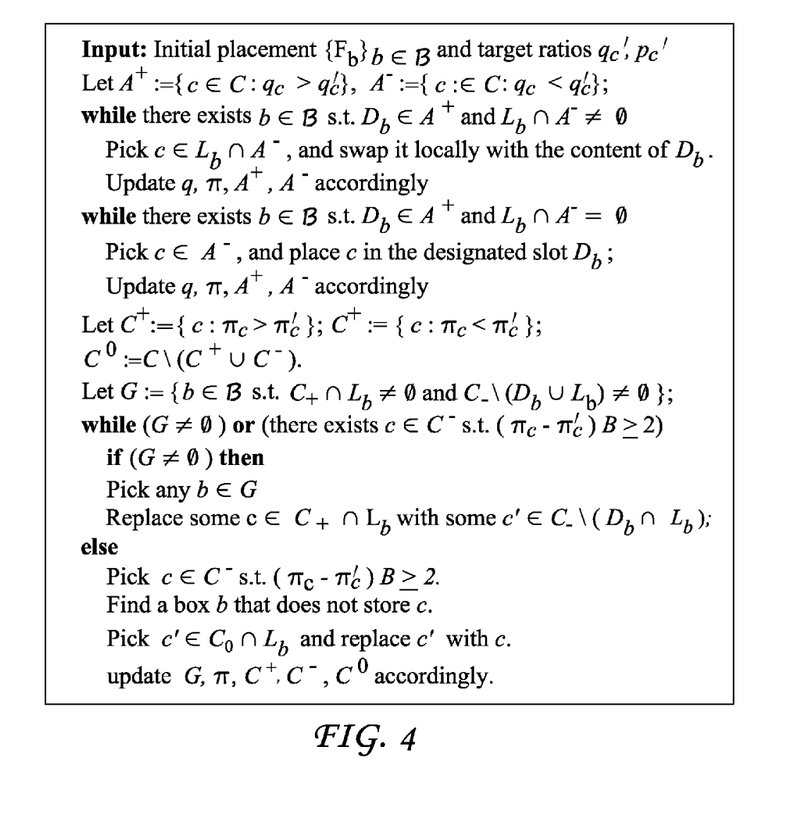
FIG. 4 depicts a placement algorithm according to an embodiment.

It is assumed that $q'_c$ B and $p'_c$ B are integers—for large B, this is a good approximation. Let $q_c$, $p_c$ be the corresponding designated slot and overall fractions in the input placement $\{F_b\}_{b \in B}$. Let $\pi_c = p_c - q_c$, $\pi'_c = p'_c - q'_c$. A lower bound on the number of cache modification operations needed to go to the target replication ratios is given by $B\delta/2$, where $\delta = \Sigma_c |p_c - p'_c|$.

The algorithm's performance in terms of cache modification operations is expressed as a function of the cache size M and of the quantities $\alpha = \Sigma_c |q_c - q'_c|$, $\beta = \Sigma_c |\pi_c - \pi'_c|$. In particular, the content placement algorithm in FIG. 4 leads to a content replication $\{F_b\}_{b \in} B$ in which exactly $q'_c$ B gateways store c in their designated slot, and $p''_c$ B gateways store c overall, where $\Sigma_c |p'_c - p''_c| B < 2M$, and $|p'_c - p''_c| B \leq 1$, for all $c \in C_j$, using at most $B[\alpha + (M-1)(\alpha + \beta)]/2$ write operations. Note that the proof the above can be found in the paper "Orchestration of Massively Distributed CDNs."

In other words, the algorithm produces a placement in which at most 2M contents are either under or over-replicated, each one only by one replica.

Referring to FIG. 4, to modify the designated slots, the algorithm picks any over-replicated content c in set $A_+ = \{c: q_c > q'_c\}$. For any user holding c in its designated slot, it checks whether it holds in its normal slots an under-replicated content $c' \in A_- = \{c: q_c < q'_c\}$. If such content exists, it renames the corresponding slot as "designated" and the slot holding c as "normal". This incurs no cache delete-write, and reduces the $l_1$ norm—i.e., the imbalance—between the vectors Bq and Bq' by 2. This is repeated until an under-replicated content c' cannot be found within the normal cache slots of gateways storing some $c \in A_+$. If there still are over-replicated items in A+, some $c' \in A_-$ is selected arbitrarily and overwrites c within the designated slot. This again reduces imbalance by 2, involving one delete-write operation.

At the end of this phase, the replication rates within the designated slots have reached their target Bq', incurring a cost of at most $B\alpha/2$ operations. The resulting caches are free of duplicate copies. Also, after these operations, the intermediate replication rates within the normal cache slots $B\pi_c$, verify $|B\pi_c - B\pi'_c| \leq |Bq_c - Bq'_c|$.

Below considers the transformation of the intermediate replication rates $\pi_c$ into replication rates $\pi'$. To this end, it distinguishes contents c that are over-replicated, under-replicated and perfectly replicated by introducing $C_+ = \{c: \pi_c > \pi'_c\}$, $C_- = \{c: \pi_c < \pi'_c\}$, $C_0 = \{c: \pi_c = \pi'_c\}$.

For any gateway b, if there exists $c \in C_+ \cap L_b$, and $c' \in C_- \setminus (D_b \cup L_b)$, the algorithm replaces c by c' within $L_b$, thereby reducing the $l_1$ distance—i.e., the imbalance—between vectors $B\pi$ and $B\pi'$ by 2. The corresponding operation is called a greedy reduction. Eventually, the algorithm may arrive at a configuration where no such changes are possible. Then, for any gateway b such that $C_+ \cap L_b$ is not empty, necessarily $C_- \subset (D_b \cup L_b)$. Hence, the size of $C_-$ is at most M−1.

In that case, the algorithm picks some content c' that is under-replicated by at least 2 replicas, and finds a user b which does not hold c', i.e. $c' \in C_- \setminus (D_b \cup L_b)$. It also selects some content c within $C_0 \cap L_b$: such content must exist, since $|C_-| \leq M-1$, and necessarily $C_- \cap L_b \subset C_- \setminus \{c'\}$ has size strictly less than M−1, the size of $L_b$; the remaining content c must belong to $C_0$ since otherwise it could have performed a greedy reduction.

Content c is then replaced by content c'. This does not change the imbalance, but augments the size of set $C_0$: indeed content c is now under-replicated (one replica missing). Then, a greedy reduction is attempted, i.e., a replacement of an over-replicated content by c if possible. If not, the previous step is repeated, i.e., by identifying some content under-replicated by at least 2, and creating a new replica in place of some perfectly replicated item, thereby augmenting the size of $C_-$ while maintaining imbalance. In at most M−1 steps, the algorithm inflates the size of $C_-$ to at least M, at which stage it is known that some greedy imbalance reduction can be performed. This procedure terminates when the size of $C_-$ is at most M−1, and each of the corresponding contents is missing only one replica.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and varies embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A content distribution network, comprising:
   a content server that stores a set of content items;
   a plurality of gateways for storing and serving content requests to a subset of the content items, the plurality of gateways being grouped into a plurality of classes of gateways; and
   a plurality of class trackers corresponding to the plurality of classes of gateways;
   wherein each class tracker manages a placement of content items and an assignment of content requests for its corresponding class of gateways;
   wherein the plurality of class trackers exchange congestion signals among themselves;
   wherein, for each content item, each class tracker determines a replication ratio determining a fraction of gateways in its corresponding class of gateways that store a copy of a content item and a forwarding rate determining a rate of content requests that are forwarded to the content server or other class trackers, based on requests for the content item entering its class and the congestion signals received from other class trackers; and
   wherein each class tracker adapts the replication ratio and forwarding rate such that an aggregate traffic load of each class does not exceed a total upload capacity of each class and such that a traffic load imposed on each class by requests for a content item does not exceed an upload capacity of gateways storing the content item.

2. The content distribution network according to claim 1, wherein each gateway comprises a plurality of storage slots for storing content items, wherein one of the plurality of storage slots is accessed by other gateways.

3. The content distribution network according to claim 1, wherein each class tracker tracks which gateways are in its class, which gateways are on or off, the content stored on each gateway, and which gateway is busy or idle.

4. The content distribution network according to claim 1, wherein the exchange of congestion signals is carried out periodically; and, after each exchange, each class tracker updates, for each content item, the fraction of gateways in its corresponding class of gateways that store the content item and the rate of content requests that are forwarded to the content server or other class trackers.

5. The content distribution network according to claim 1, wherein, for each content item, each class tracker determines the fraction of gateways in its corresponding class of gateways that store the content item and the rate of content requests that are forwarded to the content server or other class trackers, is further based on minimizing cross-traffic costs associated with content requests that are forwarded to the content server or other class trackers.

6. A method of operating a content distribution network, the content distribution network comprising a content server that stores a set of content items, a plurality of gateways for storing and serving content requests to a subset of the content items, the plurality of gateways being grouped into a plurality of classes of gateways, and a plurality of class trackers corresponding to the plurality of classes of gateways, the method comprising:
   managing, by each class tracker, a placement of content items and an assignment of content requests for its corresponding class of gateways;
   exchanging congestion signals among the plurality of class trackers; and
   for each content item, determining, by each class tracker, a replication ratio determining a fraction of gateways in its corresponding class of gateways that store a copy of a content item and a forwarding rate determining a rate of content requests that are forwarded to the content server or other class trackers, based on requests for the content item entering its class and the congestion signals received from other class trackers; and
   adapting by each class tracker the replication ratio and forwarding rate such that an aggregate traffic load of each class does not exceed a total upload capacity of each class and such that a traffic load imposed on each class by requests for a content item does not exceed an upload capacity of gateways storing the content item.

7. The method according to claim 6, wherein each gateway comprises a plurality of storage slots for storing content items, wherein one of the plurality of storage slots is accessed by other gateways.

8. The method according to claim 6, wherein each class tracker tracks which gateways are in its class, which gateways are on or off, the content stored on each gateway, and which gateway is busy or idle.

9. The method according to claim 6, further comprising:
   carrying out the exchange of congestion signals periodically; and
   after each exchange, for each content item, updating, by each class tracker, the fraction of gateways in its corresponding class of gateways that store the content item and the rate of content requests that are forwarded to the content server or other class trackers.

10. The method according to claim 6, wherein, for each content item, the determining by each class tracker the fraction of gateways in its corresponding class of gateways that store the content item and the rate of content requests that are forwarded to the content server or other class trackers, is further based on minimizing cross-traffic costs associated with content requests that are forwarded to the content server or other class trackers.

11. Apparatus comprising one or more processors configured to manage a placement of content items and an assignment of content requests for a first subset of a plurality of gateway devices, wherein the one or more processors:
    receives a congestion signal;
    determines a replication ratio determining a fraction of gateway devices in the first subset of gateway devices that store a copy of a content item and a forwarding rate determining a rate of content requests that are forwarded to a content server or to a second subset of the plurality of gateway devices, based on requests for the content item entering the class and the received congestion signal; and
    adapting the replication ratio and forwarding rate such that an aggregate traffic load of the first subset of the plurality of gateway devices does not exceed a total upload capacity of the first subset and such that a traffic load imposed on the first subset by requests for a content item does not exceed an upload capacity of gateway devices in the first subset storing the content item.

12. The apparatus of claim 11, wherein the one or more processors are further configured to track which gateway devices among the plurality of gateway devices are in the first subset, which gateway devices in the first subset are on or off, the content stored on each gateway device in the first subset, and which gateway devices in the first subset are busy or idle.

13. The apparatus of claim 12, wherein the one or more processors are further configured to determine the replication ratio and forwarding rate based on minimizing a cross-traffic cost associated with content requests that are forwarded to the content server or to the second subset of gateway devices.

14. The apparatus of claim 13 wherein:
- the one or more processors are included in one of a plurality of class trackers included in a content distribution network comprising the content server, the plurality of gateway devices and the plurality of class trackers;
- the plurality of gateway devices are grouped into a plurality of classes of gateway devices;
- the plurality of class trackers correspond to the plurality of classes of gateway devices; and
- the first and second subsets of gateway devices correspond to first and second ones of the plurality of classes of gateway devices.

* * * * *